(12) United States Patent
Lin

(10) Patent No.: US 9,094,264 B2
(45) Date of Patent: Jul. 28, 2015

(54) METHOD AND APPARATUS FOR DUAL STACK ACCESS

(75) Inventor: Tao Lin, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 1152 days.

(21) Appl. No.: 12/757,261

(22) Filed: Apr. 9, 2010

(65) Prior Publication Data

US 2011/0106947 A1    May 5, 2011

(30) Foreign Application Priority Data

Oct. 30, 2009  (CN) .......................... 2009 1 0210184

(51) Int. Cl.
*G06F 15/16* (2006.01)
*H04L 29/12* (2006.01)
*H04L 29/06* (2006.01)
*H04L 12/931* (2013.01)

(52) U.S. Cl.
CPC .... *H04L 29/12216* (2013.01); *H04L 29/12245* (2013.01); *H04L 29/12915* (2013.01); *H04L 29/12971* (2013.01); *H04L 61/203* (2013.01); *H04L 61/6059* (2013.01); *H04L 61/6086* (2013.01); *H04L 63/0263* (2013.01); *H04L 63/10* (2013.01); *H04L 69/18* (2013.01); *H04L 49/602* (2013.01)

(58) Field of Classification Search
CPC ............ H04L 61/6086; H04L 61/6059; H04L 63/0263; H04L 63/10; H04L 61/203; H04L 49/602; H04L 29/12216; H04L 29/12245; H04L 29/12915; H04L 29/12971; H04L 69/18
See application file for complete search history.

(56) References Cited

U.S. PATENT DOCUMENTS

| | | | | |
|---|---|---|---|---|
| 5,684,951 A * | 11/1997 | Goldman et al. | ................. | 726/6 |
| 6,415,329 B1 * | 7/2002 | Gelman et al. | ................ | 709/245 |
| 6,476,833 B1 * | 11/2002 | Moshfeghi | .................... | 715/854 |
| 6,708,219 B1 * | 3/2004 | Borella et al. | ................ | 709/245 |
| 6,768,743 B1 * | 7/2004 | Borella et al. | ................ | 370/401 |
| 6,801,528 B2 * | 10/2004 | Nassar | .......................... | 370/389 |
| 6,996,621 B1 * | 2/2006 | Borella et al. | ................ | 709/228 |
| 7,171,492 B1 * | 1/2007 | Borella et al. | ................ | 709/245 |
| 7,286,512 B1 * | 10/2007 | Borella | ........................ | 370/338 |
| 7,554,993 B2 * | 6/2009 | Modi et al. | .................... | 370/401 |

(Continued)

FOREIGN PATENT DOCUMENTS

| | | |
|---|---|---|
| CN | 1658562 | 8/2005 |
| CN | 1980252 | 6/2007 |
| CN | 101552783 | 10/2009 |

OTHER PUBLICATIONS

Y. Shirasaki et al., RFC 4241; Dec. 2005; Network Working Group.*

*Primary Examiner* — Arvin Eskandarnia
*Assistant Examiner* — Anthony Fabbri
(74) *Attorney, Agent, or Firm* — Patent Law Group LLP

(57) ABSTRACT

The present invention discloses a method of dual stack access, wherein a network device authenticates the first protocol address of a requesting client, stores the user name, first protocol address, and address status information of the client in the user information table if the authentication succeeds, assigns a second protocol address to the client, stores this second protocol address and address status information in the user information table, generates control rules for the client according to its user information, and controls dual stack access of the client according to the rules. This invention provides effective authentication-based access control of dual stack users.

20 Claims, 8 Drawing Sheets

(56) References Cited

U.S. PATENT DOCUMENTS

| | | | |
|---|---|---|---|
| 2002/0003780 A1* | 1/2002 | Braun et al. | 370/254 |
| 2002/0191567 A1* | 12/2002 | Famolari et al. | 370/335 |
| 2003/0217179 A1* | 11/2003 | Famolari et al. | 709/245 |
| 2004/0071087 A1* | 4/2004 | Siev et al. | 370/235 |
| 2004/0148417 A1* | 7/2004 | Roh et al. | 709/230 |
| 2004/0162909 A1* | 8/2004 | Choe et al. | 709/230 |
| 2006/0069714 A1* | 3/2006 | Blount et al. | 709/203 |
| 2006/0165093 A1* | 7/2006 | Borella et al. | 370/395.52 |
| 2008/0031183 A1* | 2/2008 | Aso et al. | 370/328 |
| 2008/0127320 A1* | 5/2008 | De Lutiis et al. | 726/9 |
| 2009/0313320 A1* | 12/2009 | Parsons et al. | 709/203 |
| 2011/0264779 A1* | 10/2011 | Noll et al. | 709/223 |

\* cited by examiner

METHOD AND APPARATUS FOR DUAL STACK ACCESS

BACKGROUND

Internet Protocol version 6 (IPv6) is the next-generation Internet protocol version, or, the protocol of the next generation Internet. IPv6 was first developed due to IPv4 address depletion. Because insufficient IPv4 address space restricted the Internet development, IPv6 was introduced to expand the address space. Using 128-bit addresses, IPv6 provides a much larger address space than IPv4. Estimated conservatively, more than 1000 IPv6 addresses are assignable on each square meter of the Earth's surface. IPv6 eliminates the address depletion problem and provides better solutions to end-to-end IP connections, service quality, security, multicast, mobility, plug-and-play, and other features. Hence, IPv6 has wide application prospects.

At present, most IPv6-capable local area networks (LANs) support IPv4/IPv6 dual stack access. Terminals in such a LAN obtain their IPv6 addresses through stateless address configuration or the Dynamic Host Configuration Protocol (DHCP).

IPv6 stateless address configuration is based on the IPv6 Neighbor Discovery Protocol (NDP). IPv6 NDP uses five types of ICMPv6 messages to perform functions such as address resolution, neighbor reachability detection, duplicate address detection, router discovery, prefix discovery, address autoconfiguration, and redirection. IPv6 stateless address configuration does not authenticate the requesting terminals.

Designed for IPv6 addressing, the Dynamic Host Configuration Protocol for IPv6 (DHCPv6) assigns a requesting terminal an IPv6 address and other configuration parameters. DHCP address allocation does not authenticate the requesting terminals.

When a terminal configured with IPv4 and IPv6 addresses intends to access the network, the IPv4 address needs to pass portal authentication, whereas the IPv6 address can lead the terminal to the external network through a distribution layer device without any authentication. In addition, IPv4 authentication is unrelated to the IPv6 protocol stack.

Hence, existing IPv4/IPv6 dual stack access methods do not authenticate IPv6 address allocation and network access, that is, they lack effective control over IPv4/IPv6 dual stack access.

SUMMARY

The present invention provides a method and apparatus for dual stack access to perform network access control of dual stack users.

The invention provides a method of dual stack access, which is applicable to a dual stack system comprising a dual stack client and a dual-stack access network device and comprises:

the network device authenticating the first protocol address of the client and, if the authentication succeeds, storing the user name, first protocol address, and address status information of the client in the user information table;

the network device assigning a second protocol address to the client and storing this second protocol address and address status information in the user information table; and the network device generating control rules for the client according to its user information, and controlling dual stack access of the client according to the rules;

wherein:

the first protocol address is an IPv4 address, and the second protocol address is an IPv6 address;

the steps with which the network device authenticates the first protocol address of the client and, if the authentication succeeds, stores the user information of the client in the user information table further comprise storing the IPv4 address of the client in the user information table and setting the IPv4 address status to NORMAL; and the steps with which the network device assigns a second protocol address to the client and stores this second protocol address and address status information in the user information table further comprise informing the client of the IPv6 address allocation method by sending it a unicast Router Advertisement (RA) message, reading messages exchanged in the IPv6 address allocation process, obtaining and storing the IPv6 address and address status information in the user information table;

wherein:

the steps with which the network device reads messages exchanged in the IPv6 address allocation process, obtains and stores the IPv6 address and address status information in the user information table further comprise:

setting the IPv6 address status to RA after the network device sends the unicast RA message to the client; and storing the IPv6 address of the client in the user information table and setting the IPv6 address status to DAD, if receiving from the client a Duplicate Address Detection (DAD) Neighbor Solicitation (NS) message for the IPv6 address within a predefined RA delay, and this IPv6 address is in RA state; or setting the IPv6 address status to NORMAL if receiving no Neighbor Advertisement (NA) message from the client within a predefined DAD delay;

wherein:

the first protocol address is an IPv6 address, and the second protocol address is an IPv4 address;

the steps with which the network device authenticates the first protocol address of the client and, if the authentication succeeds, stores the user information in the user information table further comprise storing the IPv6 address of the client in the user information table and setting the state of this address to NORMAL; and the steps with which the network device assigns a second protocol address to the client and stores this second protocol address and address status information in the user information table further comprise reading messages exchanged in the IPv4 address allocation process, obtaining and storing the IPv4 address and address status information in the user information table;

wherein:

the steps with which the network device assigns a second protocol address to the client and stores this second protocol address and address status information in the user information table further comprise:

reading messages exchanged in the allocation process of the second protocol address, obtaining the port of the client, and searching the user information table for the corresponding entry of the client according to the port; and storing the second protocol address and address status information in the corresponding entry of the client;

wherein:

the step with which the network device generates control rules for the client according to its user information further comprises:

allowing the client to access the network through its first protocol address and/or the second protocol address if the first protocol address and/or the second protocol address in the corresponding entry of the client are in NORMAL state.

The invention provides a network device, which is applicable to a dual stack system comprising a dual-stack client and a dual-stack access network device and comprises:

an authentication unit, used to authenticate the first protocol address of the client;

an address allocation unit, used to assign a second protocol address to the client if the client passes authentication of the authentication unit;

a user information acquisition unit, used to store the client's user name, first protocol address and address status information in the user information table if the client passes authentication of the authentication unit, and store the second protocol address and address status information in the user information table after the address allocation unit assigns a second protocol address to the client; and an access control unit, used to generate control rules for the client according to the information obtained by the user information acquisition unit, and control dual stack access of the client according to the rules;

wherein:

the first protocol address is an IPv4 address, and the second protocol address is an IPv6 address;

the address allocation unit informs the client of the IPv6 address allocation method by sending it a unicast RA message if the client passes authentication of the authentication unit; and the user information acquisition unit, if the client passes authentication of the authentication unit, stores the IPv4 address in the user information table, sets the IPv4 address status to NORMAL, reads messages exchanged in the IPv6 address allocation process, obtains and stores the IPv6 address and address status in the user information table;

wherein:

the user information acquisition unit is further used to:

set the IPv6 address status to RA after sending a unicast RA message to the client; and store the IPv6 address of the client in the user information table and set the IPv6 address status to DAD, if the network device receives from the client a DAD NS message for the IPv6 address within a predefined RA delay, and this IPv6 address is in RA state; or set the IPv6 address status to NORMAL if the network device receives no NA message within a predefined DAD delay;

wherein:

the first protocol address is an IPv6 address, and the second protocol address is an IPv4 address;

the user information acquisition unit is further used to store the IPv6 address of the client in the user information table and set the IPv6 address status to NORMAL if the client passes authentication of the authentication unit, read messages exchanged in the IPv6 address allocation process, obtain and store the IPv4 address and address status in the user information table;

wherein:

the user information acquisition unit is further used to:

read messages exchanged in the allocation process of the second protocol address, obtain the port of the client, and search the user information table for the corresponding entry of the client according to the port; and store the second protocol address and address status information in the corresponding entry of the client;

wherein:

the access control unit is further used to:

allow the client to access the network through the first protocol address and/or the second protocol address if the first protocol address and/or the second protocol address in the corresponding entry of the client are in NORMAL state.

Comprised with existing technologies, the invention delivers, but not limited to, the following benefits:

In the invention, the network device authenticates the first protocol address of a dual stack client, assigns a second protocol address to the client if the authentication succeeds, stores in the user information table the user information such as the client's dual stack addresses, and generates control rules according to the stored user information, so as to implement access control of the IPv4/IPv6 dual stack client.

DESCRIPTION

IPv6 address allocation methods include stateless address configuration and DHCPv6 address configuration. The following describes the two address allocation methods in details.

IPv6 Stateless Address Configuration

IPv6 stateless address configuration is based on IPv6 NDP. IPv6 NDP uses five types of ICMPv6 messages to perform functions such as address resolution, neighbor reachability detection, duplicate address detection, router discovery, prefix discovery, address autoconfiguration, and redirect.

Table 1 describes ICMPv6 message types and functions.

TABLE 1

| ICMPv6 message | Type | Function |
| --- | --- | --- |
| Neighbor Solicitation (NS) | 135 | Obtains the link layer address of a neighbor. Verifies the reachability of a neighbor. Performs duplicate address detection. |
| Neighbor Advertisement (NA) | 136 | Responds to an NS message. Actively sent by a node to inform neighbors of its link-layer change. |
| Router Solicitation (RS) | 133 | Requests the prefix and other configuration parameters from a router for autoconfiguration upon startup. |
| Router Advertisement (RA) | 134 | Responds to an RS message. A router periodically sends RA messages including prefix information |

TABLE 1-continued

| ICMPv6 message | Type | Function |
| --- | --- | --- |
| Redirect | 137 | options and flag bits if sending of RA messages is not restricted. Sent by a default gateway to a source host when necessary conditions are met, so that the host can re-select a next hop for packet forwarding. |

The NDP primarily performs these functions:

A. Address resolution

Figure 1:
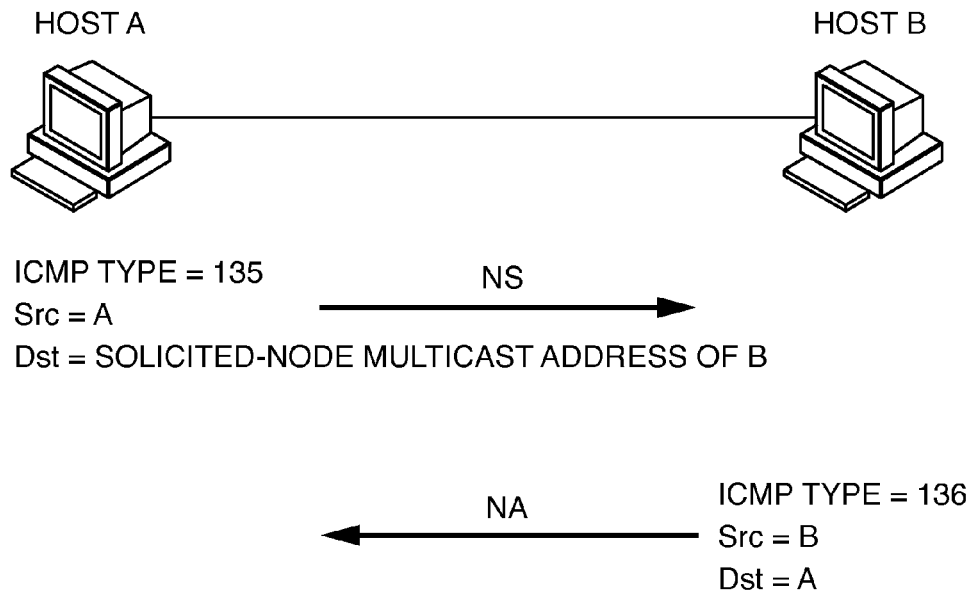
FIG. 1 is a flow chart illustrating the address resolution process in existing NDP.

NS and NA messages are used to obtain the link layer address of a neighboring node on the same link. FIG. 1 shows how Host A obtains the link layer address of Host B as follows:

(1) Host A multicasts an NS message with the IPv6 address of the sending interface as the source address to the solicited-node multicast address of Host B. This message contains the link layer address of Host A.

(2) Upon receiving the NS message, Host B compares the destination address of this message against the solicited-node multicast address corresponding to its IPv6 address. If they match, Host B learns the link layer address of Host A, and sends back a unicast NA message including its link layer address.

(3) After receiving the NA message, Host A can obtain the link layer address of Host B from the message.

B. Neighbor Reachability Detection

A node uses NS and NA messages to verify the reachability of a neighbor after obtaining the link layer address of the neighbor.

The detailed process is as follows:

(1) The node sends an NS message to the IPv6 address of the target neighbor.

(2) If receiving an NA message from the neighbor, the node considers the neighbor reachable; otherwise, the node considers the neighbor unreachable.

C. Duplicate Address Detection

Figure 2:
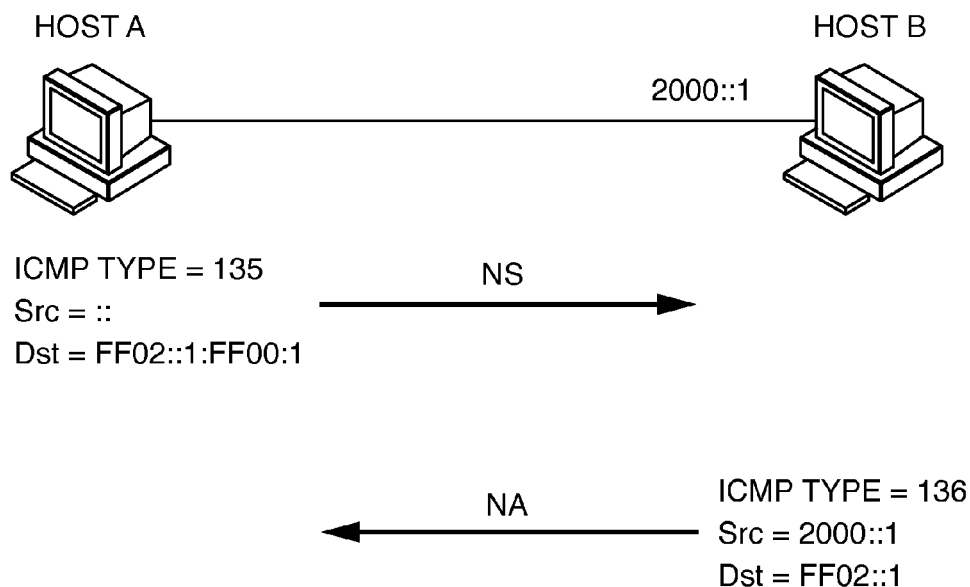
FIG. 2 is a flow chart illustrating duplicate address detection through NS and NA messages in NDP adopted by existing technologies.

When a node is assigned with an IPv6 address, it needs to detect whether the address is already used by another node. The node uses NS and NA messages to implement duplicate address detection, as shown in FIG. 2. The process is as follows:

(1) Host A sends an NS message with an unspecified source address (::) to the solicited-node multicast address corresponding to the IPv6 address that is being verified. This message contains the IPv6 address being verified.

(2) If Host B is using this IPv6 address, it sends back an NA message containing the IPv6 address.

(3) Upon receiving this NA message, Host A knows that the IPv6 address is already in use. If Host A does not receive any NA message, Host A will use the IPv6 address.

D. Router/prefix Discovery and Stateless Address Autoconfiguration

Router/prefix discovery refers to the process in which a node obtains the neighboring router, prefix of the network where the neighboring router resides, and other configuration parameters from a received RA message.

Address stateless autoconfiguration refers to the process in which a node uses information obtained from router/prefix discovery to configure an IPv6 address automatically.

The detailed process of router/prefix discovery is as follows:

(1) Upon startup, a node sends RS messages to routers, requesting for prefixes and other configuration parameters for autoconfiguration.

(2) The router responds with an RA message including prefix information options. The router also distributes RA messages periodically.

(3) The node uses the address prefix and other configuration parameters in the RA message to automatically configure its IPv6 address and other parameters. To prevent address conflicts, the node performs duplicate address detection to verify that the IPv6 address generated through autoconfiguration is not used by any other device on the network. If no conflict is detected, the node starts to use the IPv6 address.

The prefix information options contain address prefix information, and the preferred lifetime and valid lifetime of the address prefix. Upon receiving an RA message that is sent periodically, the node updates the preferred lifetime and valid lifetime of the prefix according to the message.

An IPv6 address generated through autoconfiguration can be normally used within its valid lifetime. Once the valid lifetime expires, the IPv6 address is deleted.

DHCPv6 Address Configuration

Compared with other IPv6 address allocation methods such as manual configuration and stateless autoconfiguration through the network prefix in an RA message, DHCPv6 has the following merits:

DHCPv6 provides more control over address assignment. It records the addresses assigned to hosts, and assigns specific addresses to hosts, thus facilitating network management.

In addition to IPv6 addresses, DHCPv6 also assigns other configuration parameters such as DNS server addresses and domain names.

To obtain an IPv6 address and other configuration parameters, a DHCPv6 client uses a link-local multicast address to contact DHCPv6 servers. If a DHCPv6 server and a DHCPv6 client are not on the same subnet, the client can contact the server through a DHCPv6 relay agent. DHCPv6 relay agents save costs and facilitate management by eliminating the need of deploying a DHCPv6 server on each subnet.

Figure 3:
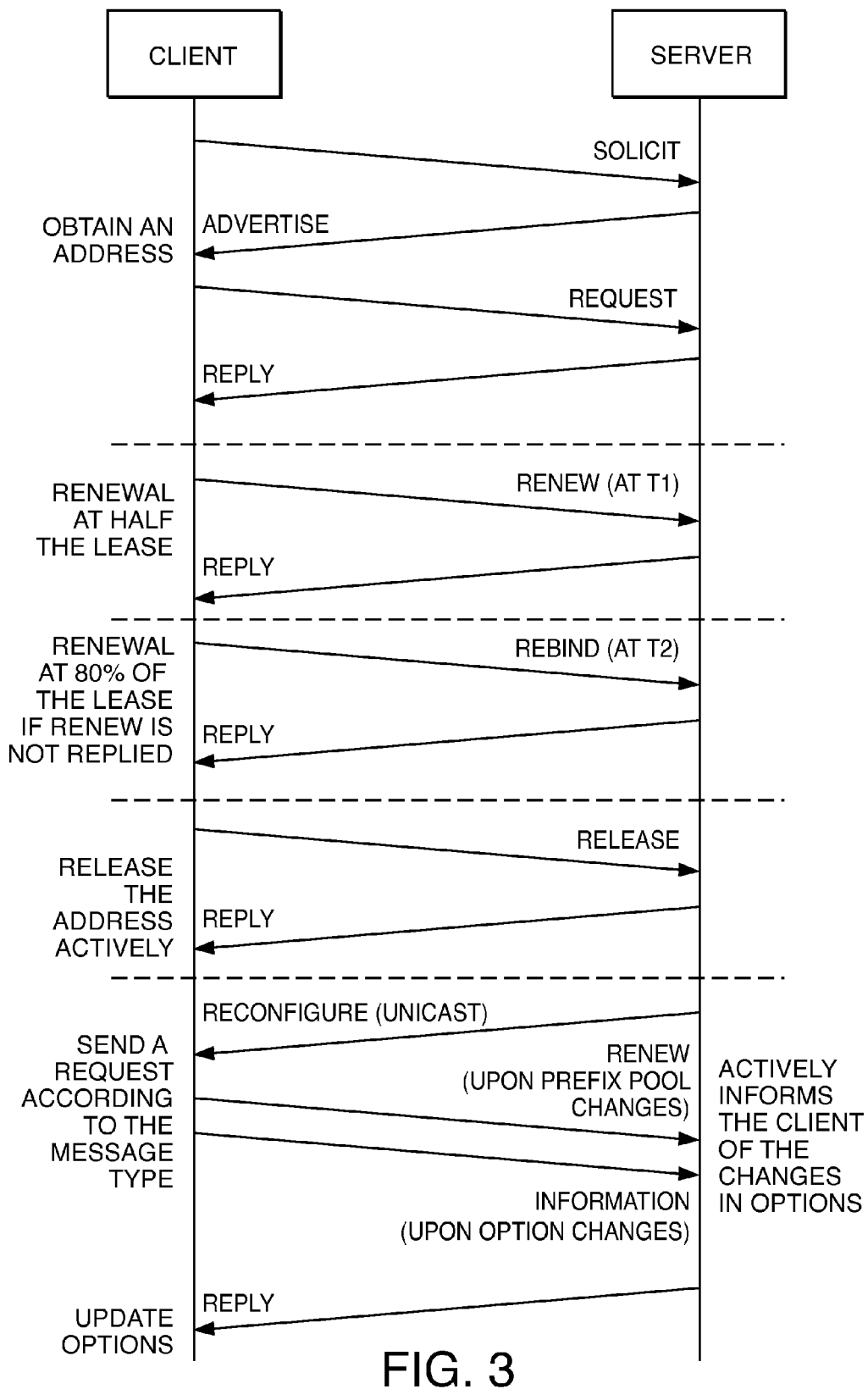
FIG. 3 illustrates the dynamic IPv6 address allocation process in existing technologies.

DHCPv6 adopts a client-server model. The client sends a request to the server, and the server responds the client with IP addresses and other configuration parameters to achieve dynamic address configuration. FIG. 3 shows the process of dynamic IPv6 address allocation through DHCPv6.

(1) The client actively multicasts a Solicit message to FF02::1:2, the All_DHCP_Relay_Agents_and_Servers address.

(2) Each DHCPv6 server residing on the subnet responds with an Advertise message, informing the client of its existence. The message contains the server ID and priority option.

(3) The client collects all the Advertise messages received from different DHCPv6 servers in a specific time interval, selects the best DHCPv6 server according to the priority options, and records the server priority and the IPv6 address this server offers in the Advertise message. If the selected server does not respond in subsequent message exchange process, the client selects another server according to the selection policy.

(4) After selecting a server, the client sends it a Request message containing the server ID.

(5) Upon receiving the message, the server compares the server ID in the message against its server ID. If they do not match, the server discards the message. If they match, the server selects a prefix from the prefix pool and assigns the prefix to the client in a Reply message.

(6) Upon receiving the Replay message, the client reads the options in the message and configures parameters according to the options. If an error occurs, the client operates according to the error code.

(7) At time T1, the client sends a Renew message to the server that granted the IPv6 addresses in an Identity Association (IA).

(8) The server renews the lease according to the address binding, fills the Options field, and sends back a Reply message. The client can sense any change in the Options field.

(9) If no response to the Renew message sent at T1 is received, the client sends a Rebind message at time T2.

(10) Upon receiving this message, the server acts in a similar way to that in step 8, and sends back a Reply message.

(11) If permitted, the server actively sends the client a Reconfigure message when any option changes at the server side, notifying that the client needs to update configuration parameters.

(12) If the client is permitted to receive Reconfiguration messages, the client resolves OPTION_RECONF_MSG (19) in the received Reconfigure message. If Msg-type is 5, the client sends a Renew message to the server. If Msg-type is 11, the client sends an Information-request message to the server.

(13) If the client no longer needs to use an IPv6 address, for example, the client intends to go offline, the client sends a Release message to the server, and the server will mark this address as idle.

(14) When the client restarts, or its physical connection state changes, the client sends a Confirm message to the server, confirming use of the prefix/address that was previously assigned to it.

DHCPv6 also provides a rapid address allocation method, in which the client sends a Solicit message with a Rapid-commit option, and the server will directly respond with a Reply message upon receiving this message.

Figure 4:
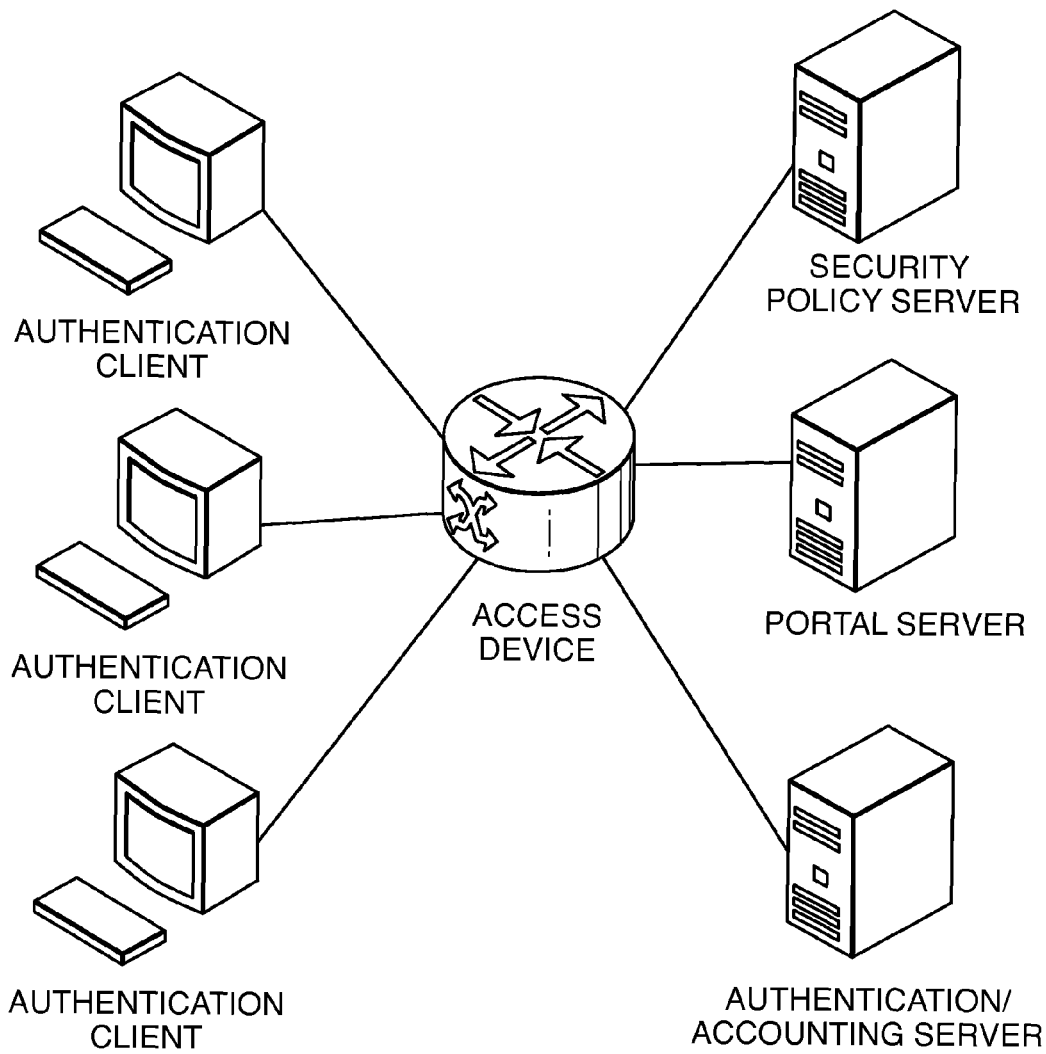
FIG. 4 is a network diagram of portal authentication in existing technologies.

A user using an IPv4 address usually needs to pass portal authentication before it can access the network. Portal authentication is also called web portal authentication. FIG. 4 depicts a typical network diagram of portal authentication comprising five basic elements, the authentication clients, access device, portal server, authentication/accounting server, and security policy server. The following describes the elements in details.

1. Authentication Client

An authentication client, or a portal client, is a host using an HTTP browser or running portal client software. A terminal uses the portal client to exchange messages with a security policy server to pass security check.

2. Access Device

Access devices can be switches, routers, or any other broadband access devices. An access device redirects all HTTP requests from the clients in an authentication subnet to a portal server for authentication, exchanges messages with the portal server, security policy server, and authentication/accounting server to complete identity authentication, security authentication and accounting, and permits clients that pass authentication to access the Internet resources authorized by the administrator.

3. Portal Server

A portal server receives the authentication requests from portal clients, provides free portal services and web portal authentication interfaces, and exchanges with access devices the authentication information of authentication clients.

4. Authentication/Accounting Server

An authentication/accounting server interacts with access devices to complete user authentication and accounting.

5. Security policy server

A security policy server interacts with portal clients and the access device to perform security authentication and authorize users.

The interacting process among these basic elements is as follows:

(1) After an unauthenticated user types an Internet address in the address bar of a browser, a HTTP request is sent out and then redirected by the access device to the web authentication page of the portal server. To use the extended portal authentication functions, the user must use a portal client.

HTTP redirection ensures that users can always get specific web pages regardless of the addresses they enter. With redirection, a web server can send redirect messages such as HTTP 302 messages to clients, instructing them to re-submit requests destined for the new locations. Clients are then redirected to other files, directories, or websites.

(2) The user submits authentication information in the authentication page or dialog box, and the portal server will transmit the authentication information to the access device.

(3) The access device contacts the authentication/accounting server(s) to perform authentication and accounting.

(4) When authentication is complete, the access device enables access to the Internet for the user if no security policy is applied to the user, or collaborates with the client, access device, and security policy server to perform a security check on the user if a security policy is applied to the user. In the latter case, after the security check is complete, the security policy server authorizes the user to access specific resources according to the security level of the user.

Essentials of the invention are as follows:

The network device first authenticates the first protocol address of a dual stack access user, and then assigns a second protocol address to the user if the authentication succeeds. For example, after an IPv4/IPv6 dual stack user passes IPv4 authentication, the network device assigns an IPv6 address to it, stores the dual stack addresses and other user information in the user information table, generates control rules for the user according to the user information, and controls network access of the user according to the rules. In this way, the network device implements access control of IPv4/IPv6 dual stack users.

Figure 5:
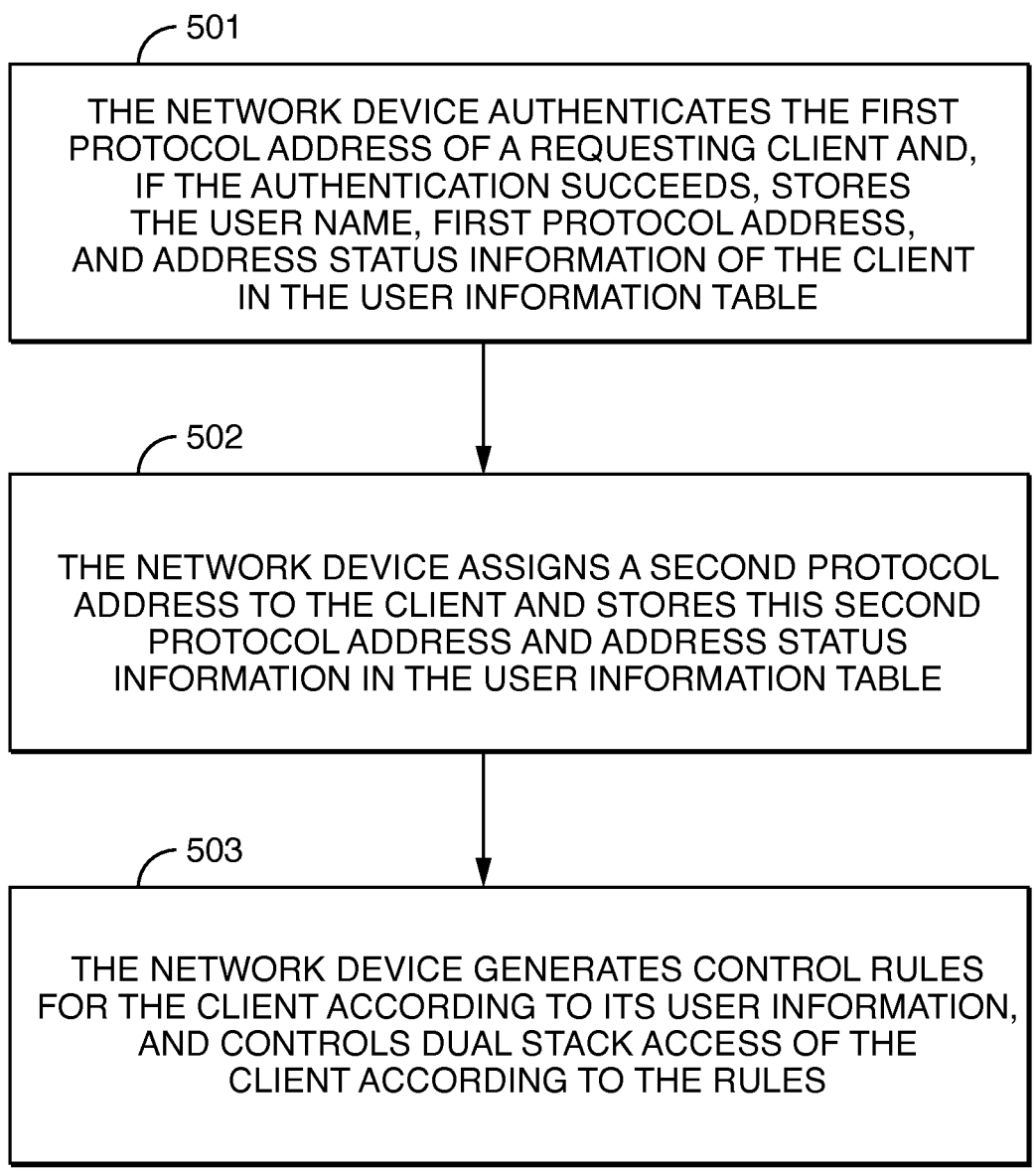
FIG. 5 is a flow chart illustrating a method of secure dual-stack access in accordance with the invention.

The invention provides a method of dual stack access, which is applicable to a dual stack system comprising a dual stack client and a dual-stack access network device. As shown in FIG. 5, this method comprises the following:

At step 501, the network device authenticates the first protocol address of the client and, if the authentication succeeds, stores the user name, first protocol address, and address status information of the client in the user information table;

At step 502, the network device assigns a second protocol address to the client and stores this second protocol address and address status information in the user information table; and At step 503, the network device generates control rules for the client according to its user information, and controls dual stack access of the client according to the rules.

To provide a more complete understanding of the present invention, the following describes the method for secure dual-stack access in conjunction with specific embodiments.

Figure 6:
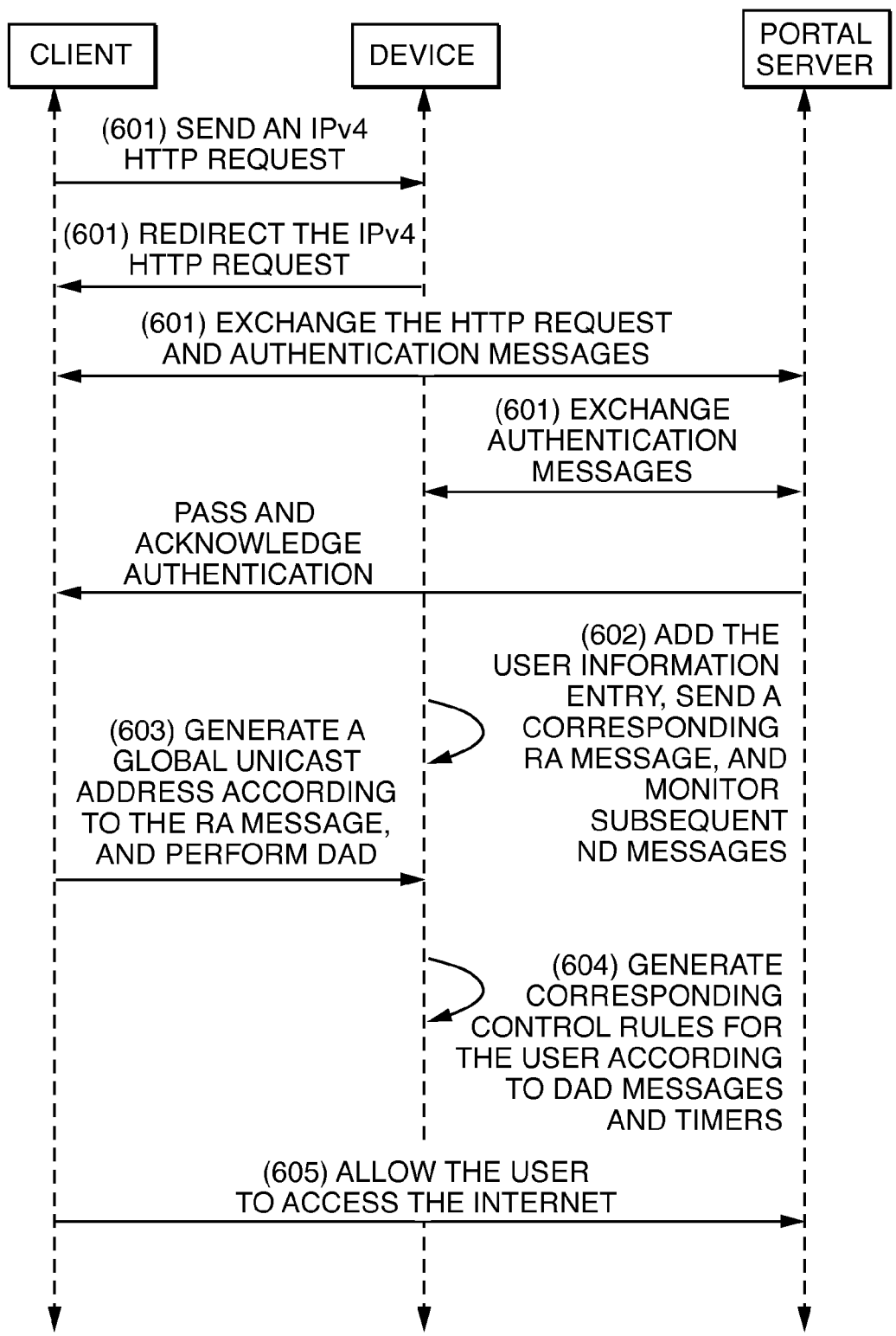
FIG. 6 is a flow chart illustrating a method of dual stack access in embodiment 1 of the invention.

Embodiment 1 of the invention provides a secure dual-stack access method that prevents users with unauthenticated IPv6 addresses from accessing the external network through the network device. In embodiment 1 of the invention, a user with an IPv6 address has restricted rights after the user passes IPv4 authentication, and the IPv6 address allocation process of the user is monitored and controlled. As shown in FIG. 6, the method in embodiment 1 comprises these steps:

At step 601, the network device receives an IPv4 HTTP request from the client, and redirects this packet to the portal server for forcible portal authentication.

More specifically, the network device acts as the destination host of the IPv4 HTTP request, establishes a TCP connection with the requesting host, and redirects the connection to the portal server by using HTTP redirection.

At step 602, after the client passes IPv4 authentication, the network device stores the user information of the client in the user information table, and sends a unicast RA message to the client, informing it of the IPv6 address allocation method.

More specifically, to control IPv6 address allocation, all interfaces of the network device are initially disabled from sending out RA messages. Upon receiving an RS request from a client that does not pass IPv4 authentication, the network device denies the IPv6 address configuration request by not responding with any RA message.

After the client passes IPv4 authentication, the network device stores the user information of the client in the user information table. Table 2 shows the structure of a user information table.

TABLE 2

| User name | IPv4 address | IPv6 link-local address | IPv6 global unicast address | Link layer address | Port | IPv4 status | IPv6 status |
|---|---|---|---|---|---|---|---|
| User1 | IPv4 | | | LA1 | P1 | NORMAL | INIT |
| ... | ... | ... | ... | ... | ... | ... | ... |

At this time, the corresponding entry of the client contains its IPv4 address, but lacks its IPv6 link-local address and IPv6 global unicast address. The IPv4 status is NORMAL, and the IPv6 status is INIT.

The network device delivers an Access Control Lists (ACL) containing the source IPv4 address and port (and may also include the MAC address) to permit the client sourced from that IPv4 address to access the network. Then the Neighbor Discovery (ND) module of the network device sends a unicast RA message to the client, informing it of the IPv6 address allocation method.

The network device specifies different IPv6 address allocation methods with the M-bit of RA messages. An RA message with the M-bit set to 0 indicates that the client obtains an IPv6 address through stateless address autoconfiguration, whereas an RA message with the M-bit set to 1 indicates that the client requests an IPv6 address through DHCPv6. Then the network device reads the corresponding DHCPv6 messages and generates corresponding entry control rules. After an RA message is sent out successfully, the network device sets the IPv6 status in the user entry to RA.

Wherein, the ND module of the network device sending a unicast RA message to the client to inform it of the IPv6 address allocation method further comprises the following:

The ND module first searches the user information table by using the source IPv6 link-local address, link address, and port of the client, sends back a unicast RA message to the client if a matching entry with the IPv6 status of "INIT" is found, and sets the IPv6 status in the entry to RA;

At step 603, upon receiving the RA message, the client configures its IPv6 global unicast address according to the message, and performs duplicate address detection; and At step 604, the network device generates a corresponding control rule for the user entry according to the DAD message and timer, and controls network access of this IPv6 address according to the control rule.

More specifically, within predefined RA_DELAY (1 second by default), if the ND module of the network device receives a DAD NS message providing the IPv6 global unicast address of the requesting client (that is, the MAC address, port, and other user information are the same as the existing user entry), and the IPv6 status of the client's entry is RA, the ND module stores the IPv6 global address in the entry and sets the IPv6 status to DAD. Within DAD_DELAY (1 second by default), if no corresponding NA message is received, the ND module sets the IPv6 status of the entry to NORMAL and delivers an ACL containing the source IPv4 address and port (and may also include the MAC address) to permit the client with this IPv6 global address to access the Internet.

In this embodiment, after generating the user entry, the network device searches for a predefined policy, and determines the delivery of control rules according to the predefined policy. If a predefined policy is found and the policy denies the client from accessing the Internet, the network device will not deliver corresponding control rules.

At step 605, the client normally accesses the Internet resources permitted by the configured ACL.

The network device also employs a handshake mechanism. In this mechanism, an ARP packet is sent out periodically to verify that the IPv4 address of the client is online, and an NS message is sent out periodically to verify that the IPv6 address of the client is online. If the IPv4/IPv6 address is offline within a LIVE_TIME interval (180 seconds by default), the network device deletes the corresponding IPv4/IPv6 ACL, and sets the IPv4/IPv6 status of the user entry to INIT. The corresponding user entry will be removed if the client is offline for two contiguous LIVE_TIME intervals.

Embodiment 2 of the invention provides a secure dual-stack access method for IPv4-IPv6 transition. To accelerate transition to IPv6, IPv4/IPv6 dual stack is supported, and networks preferably provide IPv6 services. IPv4 networks serve as auxiliary networks and function only when IPv6 fails. Therefore, independent IPv6 access authentication is required.

Figure 7:
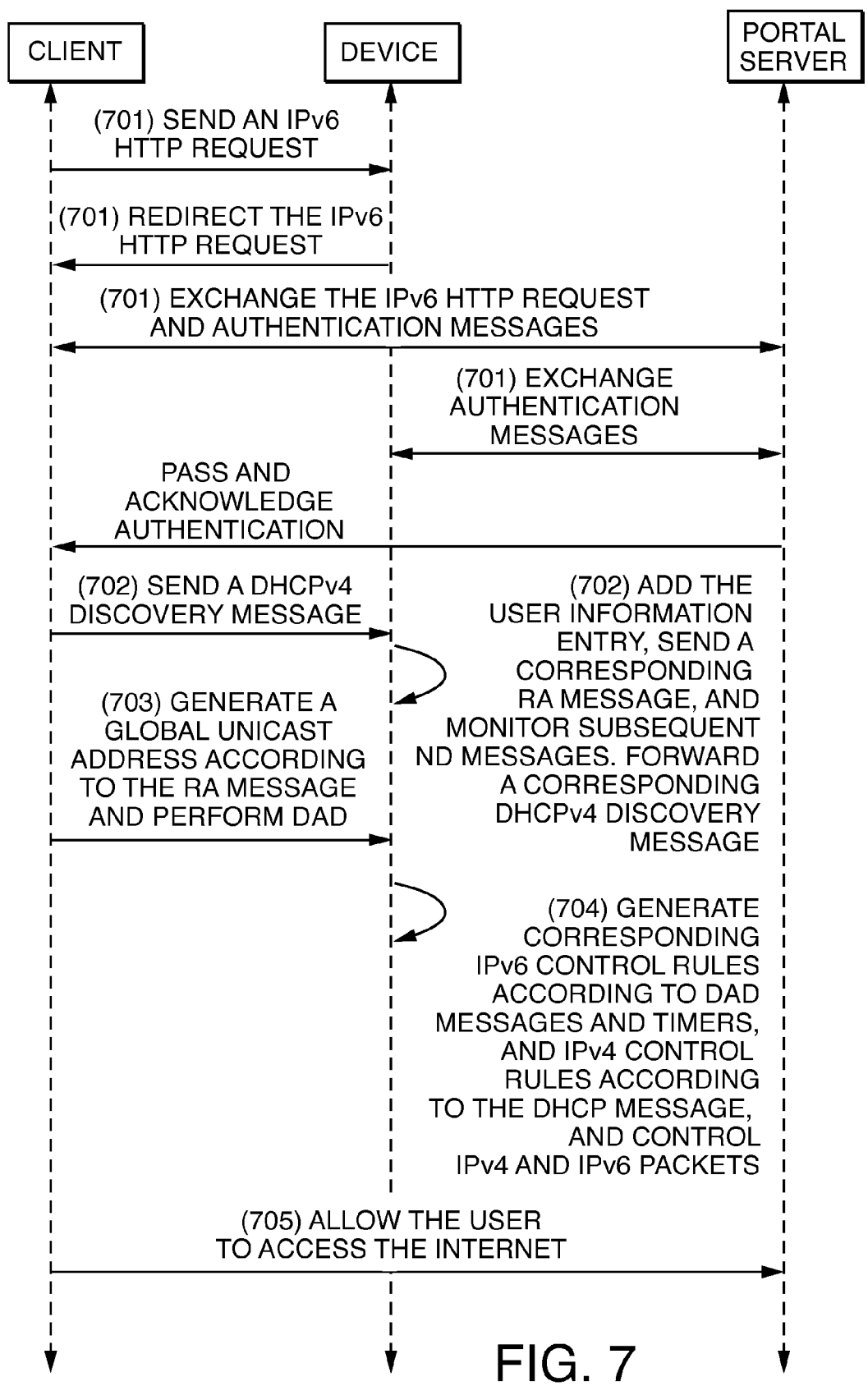
FIG. 7 is a flow chart illustrating a method of dual stack access in embodiment 2 of the present invention.

As shown in FIG. 7, the method in embodiment 2 comprises these steps:

At step 701, the network device receives an IPv6 HTTP request from the client, and redirects this packet to the portal server for forcible portal authentication.

Specifically, only the IPv6 link-local address of the client is authenticated.

At step 702, after the client passes authentication, the network device adds the user information to the user information table, and informs the client of the IPv4 address allocation method by sending a DHCP DISCOVERY message, and the IPv6 address allocation method by sending an RA message.

More specifically, after the client in step 701 passes authentication, the corresponding user entry of the client contains its IPv6 link-local address, but lacks the IPv4 address and IPv6 global unicast address. The IPv4 status and IPv6 status are INIT. The network device starts to allocate an IPv6 global unicast address through ND, and an IPv4 address through DHCP.

At step 703, upon receiving an RA message from a distribution layer switch, the client configures its IPv6 global unicast address according to the message, and performs duplicate address detection.

At step 704, the network device fills the IPv6 information of the user entry according to the DAD message and timer, fills the IPv4 information of the user entry through DHCP, and generates corresponding IPv4/IPv6 control rules according to the user entry to control IPv4 and IPv6 packet forwarding.

More specifically, if both the IPv4 status and IPv6 status of the user entry are NORMAL, the network device allows the client to access the Internet by using its IPv4 or IPv6 address, and generates control rules to permit the client to access the Internet through its IPv4 or IPv6 address. If only one protocol address is in NORMAL state, the network device allows the client to access the network by using that protocol address only, and generates corresponding control rules.

At step 705, the client accesses the Internet according to the configured IPv4 and IPv6 control rules.

In this embodiment, the portal authentication in step 701 can be performed on the IPv6 link-local address and IPv6 global unicast address. After the authentication succeeds, the network device adds the user information to the user information table, and sends a DHCP NAK message to the client or waits for the DHCP request from the client.

Embodiment 3 of the invention provides a dual-stack access method in which the network device monitors the IPv4/IPv6 address allocation process and, after the IPv4/IPv6 address passes authentication, permits the client to use either address to access the Internet or controls network access of the client according to user policies.

Figure 8:
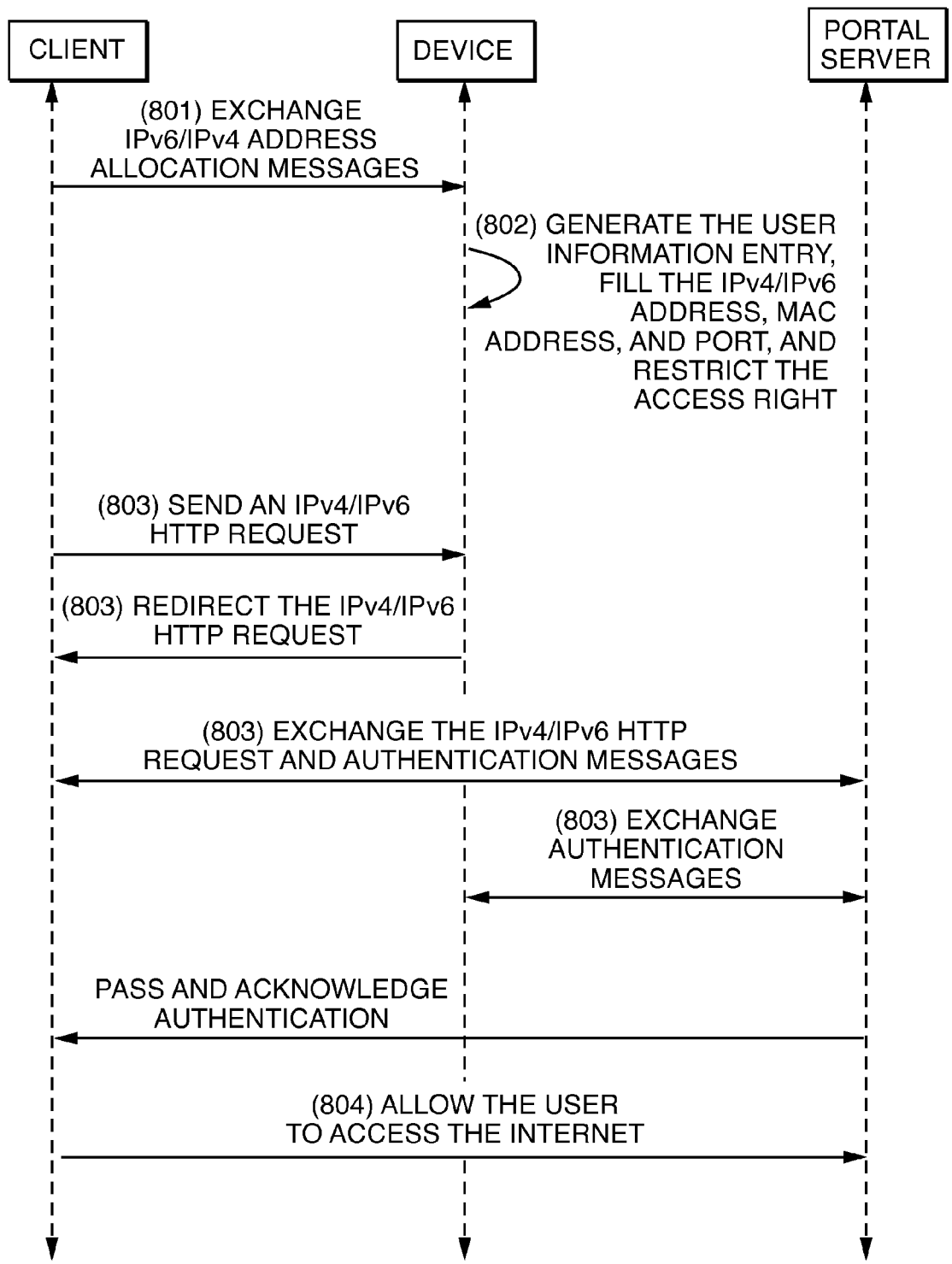
FIG. 8 is a flow chart illustrating a method of dual stack access in embodiment 3 of the present invention.
Figure 9:
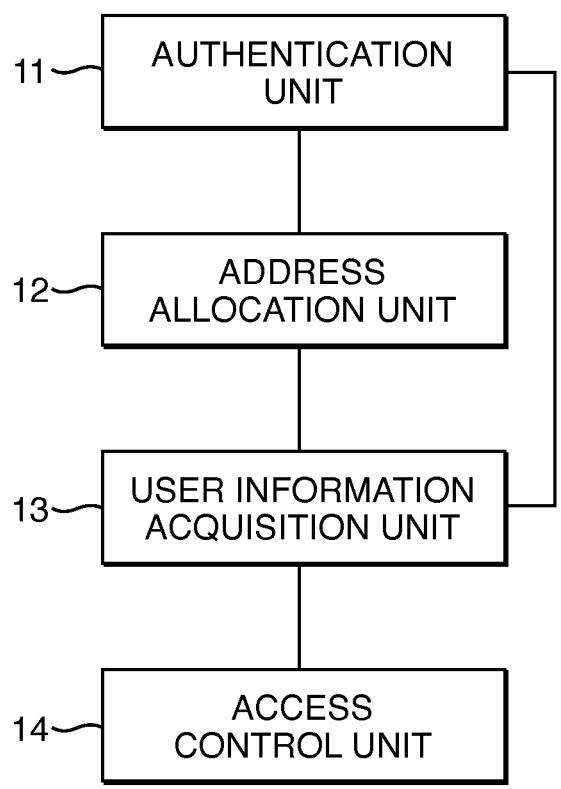
FIG. 9 is a schematic diagram illustrating the structure of a secure dual-stack access device in accordance with the invention.

As shown in FIG. 8, the method in embodiment 3 comprises these steps:

At step 801, the network device assigns an IPv4/IPv6 address to the client.

At step 802, the network device stores the IPv4/IPv6 address, MAC address, and port in the user information table.

At step 803, the network device receives an IPv6/IPv4 HTTP request from the client, and redirects the request to the portal server for forcible portal authentication.

After the authentication succeeds, the network device searches the user information according to the IPv4 and/or IPv6 address, MAC address, and port of the client, stores the user information in the user information table, and sets the IPv4/IPv6 status to NORMAL.

At step 804, the network device configures IPv4 and IPv6 control rules according to the user information, and controls forwarding of subsequent IPv4/IPv6 packets.

In the embodiments of the invention, the network device reads messages exchanged in the whole IPv4/IPv6 address allocation process.

More specifically, the network device obtains the IPv4 address by using the DHCP relay agent or DHCP snooping technology, fills the IPv4 address in the user entry, and sets the IPv4 status to ADDRLEARN.

If the IPv6 address is assigned through DHCPv6, the network device obtains the IPv6 address by using the DHCPv6 relay agent or DHCPv6 snooping technology, and fills the IPv6 address in the user entry; if the IPv6 address is configured through ND stateless address autoconfiguration, the network device obtains the IPv6 address by reading the DAD NS message and timer, fills in the IPv6 address in the user entry, and sets the IPv6 status to ADDRLEARN.

After the network device reads the IPv4/IPv6 address, it adds the address in the user information table. The network device searches the user information table according to the obtained address information of the client. If a corresponding entry already exists, the network device adds the new information to the user entry. If no user entry is found, the network device creates a new entry to store the user information of the client.

The network device in embodiments of the invention can be a distribution layer switch or a device with the same functions.

With the method of the invention, the network device authenticates the first protocol address of a dual stack user, assigns a second protocol address to the client if the authentication succeeds, stores dual stack addresses and other user information in the user information table; in an IPv4/IPv6 dual-stack environment, the network device reads messages exchanged in the IPv4/IPv6 address allocation process of an IPv4/IPv6 user, generates corresponding control rules for the IPv4/IPv6 data flows, and ensures security and controllability of the IPv4/IPv6 user through portal authentication so as to effectively control the access of LAN devices using IPv6 addresses.

The invention provides a network device, which is applicable to a dual stack system comprising a dual-stack client and a dual-stack access network device and comprises:

an authentication unit (11), used to authenticate the first protocol address of the client;

an address allocation unit (12), used to assign a second protocol address to the client if the authentication succeeds;

a user information acquisition unit (13), used to store the client's user name, first protocol address and address status in the user information table if the authentication succeeds, and to store the second protocol address and address status in the user information table if the address allocation unit (12) assigns a second protocol address to the client; and an access control unit (14), used to obtain the client's control rules from the user information acquisition unit (13), and control dual stack access of the client according to the control rules.

If the first protocol address is an IPv4 address and the second protocol address is an IPv6 address, and the client passes authentication of the authentication unit (11), the address allocation unit (12) sends a unicast RA message to the client, informing it of the IPv6 address allocation method. The user information acquisition unit (13) stores the IPv4 address in the user information table and sets the IPv4 address status to NORMAL; reads messages exchanged in the IPv6 address allocation process, obtains the IPv6 address of the client, and stores the address in the user information table. More specifically, after sending out a unicast RA message, the user information acquisition unit (13) sets the IPv6 address status to RA; if the network device receives a DAD NS message providing the IPv6 address of the client within a predefined RA delay interval, and the IPv6 address status is RA, the user information acquisition unit (13) stores the IPv6 address in the user information table, and sets the IPv6 address status to DAD; if no NA message is received within a predefined DAD delay interval, the user information acquisition unit (13) sets the IPv6 address status to NORMAL.

If the first protocol address is an IPv6 address and the second protocol address is an IPv4 address and the client passes authentication of the authentication unit (11), the user information acquisition unit (13) stores the IPv6 address in the user information table, sets the IPv6 address status to NORMAL, reads messages exchanged in the process of the IPv4 address allocation, and obtain and store the IPv4 address and address status in the user information table. The user information acquisition unit (13) further reads messages exchanged in the allocation process of the second protocol address, obtains the port of the client, searches the user information table according to the port, and stores the second protocol address and the address status in the corresponding entry.

The access control unit (14) allows the client to access the network through the first protocol address and/or the second protocol address, if the first protocol address and/or the second protocol address of the user information corresponding to the client are in NORMAL state.

The network device of the invention authenticates the first protocol address of a dual stack user, assigns a second protocol address to the client if the authentication succeeds, stores dual stack addresses and other user information in the user information table; in an IPv4/IPv6 dual stack environment, the network device reads messages exchanged in the IPv4/IPv6 address allocation process of an IPv4/IPv6 user, generates corresponding control rules for the IPv4/IPv6 data flows, and ensures security and controllability of the IPv4/IPv6 user through portal authentication, so as to effectively control access of the LAN devices using an IPv6 address.

Through the embodiments described above, one skilled in the art will clearly understand that the invention can be implemented through software and a necessary versatile hardware platform, or implemented through hardware; however, in most cases, the former is preferred. Based on such understanding, the essential of the technical proposal of the invention, or its contribution part to existing technologies could be represented by a software product. The software product is stored in a storage medium and comprises a set of instructions that enables a computer (which can be a PC, server, or network device) to perform the method of each embodiment of the invention.

Those skilled in the art could understand that the figures are schematic diagrams, and the modules or processes in these figures are not strictly required by the embodiments of the invention.

Those skilled in the art could understand that the modules in the apparatus of an embodiment could be deployed in the apparatus as illustrated in the embodiment, or deployed in one or multiple apparatus that are different from the apparatus illustrated in the embodiment. The modules in the embodiment can be combined into one module, or further divided into multiple sub-modules.

The preceding embodiments are numbered to facilitate illustration, but not to indicate preference.

Although several embodiments of the invention and their advantages are described in detail, those skilled in the art could understand that various changes in form and details may be made therein without departing from the scope of the invention encompassed by the appended claims.

The invention claimed is:

1. A method performed by a network device that controls access to a network, the method comprising:
    the network device receiving an application protocol request to access a resource of the network, the application protocol request carrying a first protocol address of a client device, wherein the first protocol address is associated with a first protocol stack;
    in response to the application protocol request, the network device requesting and verifying authentication information from the client device; and
    in response to verifying the authentication information from the client device:
        the network device storing a user name, the first protocol address, and a first address status of the client device in a user information table, wherein the first address status is associated with the first protocol address;
        the network device assigning a second protocol address to the client device;
        the network device storing the second protocol address and a second address status in the user information table, wherein the second protocol address is associated with a second protocol stack, and wherein the second address status is associated with the second protocol address;
        the network device generating control rules for the client device; and
        the network device controlling how the client device accesses the network using application protocol requests based on the control rules and the first protocol address and the second protocol address carried in the application protocol requests.

2. The method of claim 1, wherein the first protocol address is an IPv4 address and the second protocol address is an IPv6 address.

3. The method of claim 2, wherein the network device storing the first address status comprises setting the first address status to NORMAL, wherein the network device assigning the second protocol address to the client device comprises the network device sending the client device a Router Advertisement (RA) message in order to inform the client device of an IPv6 address allocation method, and wherein the network device storing the second protocol address and the second address status comprises the network device reading messages exchanged during assignment of the second protocol address to determine the second protocol address and the second address status.

4. The method of claim 3, wherein the network device reading messages exchanged during assignment of the second protocol address comprises setting second address status to RA after sending the RA message to the client device.

5. The method of claim 4, further comprising;
    after sending the RA message to the client device, the network device receiving, from the client device, a Duplicate Address Detection (DAD) Neighbor Solicitation (NS) message for the second protocol address within a predefined RA delay; and
    the network device setting the second address status to DAD.

6. The method of claim 5, further comprising:
    while the second address status is set to DAD, the network device determining that a predefined DAD delay has passed, during which the network device did not receive a Neighbor Advertisement (NA) message; and
    the network device setting the second address status to NORMAL.

7. The method of claim 1, wherein the first protocol address is an IPv6 address and the second protocol address is an IPv4 address.

8. The method of claim 7, wherein the network device storing the first address status comprises the network device setting the first address status to NORMAL, and wherein the network device assigning the second protocol address to the client device comprises the network device reading messages exchanged in an IPv4 address allocation process of the client device to determine the second protocol address.

9. The method of claim 1, wherein the network device storing the second protocol address and the second address status comprises the network device reading messages exchanged in an allocation process of the second protocol address, obtaining a port used by the client device, searching the user information table for a corresponding entry of the client device according to the port, and storing the second protocol address and the second address status in the corresponding entry of the client device.

10. The method of claim 1, wherein the network device generating the control rules for the client device comprises the network device generating rules that allow the client device to access the network using the first protocol address when the first address status is NORMAL, and network device generating rules that allow the client device to access the network using the second protocol address when the second address status is NORMAL.

11. A data processing device that controls access to a network, the data processing device comprising:
an authentication unit to verify authentication information in response an application protocol request to access a resource of the network, the application protocol request carrying a first protocol address of a client device;
an address allocation unit to assign a second protocol address to the client device after the authentication unit verifies the authentication information;
a user acquisition information unit to store a user name of the client device, the first protocol address, and a first address status in a user information table, and, after the authentication unit verifies the authentication information, to store the second protocol address and a second address status in the user information table, wherein the first address status is associated with the first protocol address and the second address status is associated with the second protocol address; and
an access control unit to generate control rules and to control how the client device accesses the network using application protocol requests based on the control rules and the first protocol address and the second protocol address carried in the application protocol requests.

12. The data processing device of claim 11, wherein the first protocol address is an IPv4 address, and the second protocol address is an IPv6 address, and wherein the user information acquisition unit stores the first address status comprises the user information acquisition unit setting the first address status to NORMAL.

13. The data processing network device of claim 12, wherein the address allocation unit is further configured to inform the client device of an IPv6 address allocation method by sending the client device a Router Advertisement (RA) message after the authentication unit authenticates the first protocol address.

14. The data processing device of claim 13, wherein the user information acquisition unit is further configured to read messages exchanged in an IPv6 address allocation process of the client device to determine the second protocol address.

15. The data processing device of claim 12, wherein the user information acquisition unit is further configured to set the second address status to Router Advertisement (RA) after sending an RA message to the client device, receive a Duplicate Address Detection (DAD) Neighbor Solicitation (NS) message from the client device within a predefined RA delay, and set the second address status to DAD.

16. The data processing device of claim 15, wherein, while the second address status is set to DAD, the user information acquisition unit is further configured to determine a Neighbor Discovery (ND) message was not received before a predefined DAD delay has passed, and set the second address status to NORMAL.

17. The data processing device of claim 11, wherein the first protocol address is an IPv6 address, and the second protocol address is an IPv4 address.

18. The data processing device of claim 17, wherein the user information acquisition unit is further configured to set the first address status to NORMAL after the authentication unit authenticates the client device, read messages exchanged in an IPv4 address allocation process of the client device, and set the second address status in the user information table based on contents of the messages.

19. The data processing device of claim 17, wherein the user information acquisition unit is further configured to read messages exchanged in an allocation process of the second protocol address, obtain a port used by the client device, search the user information table for a corresponding entry of the client device according to the port, and store the second protocol address and second address status information in the corresponding entry of the client device.

20. The data processing device of claim 19, wherein the access control unit is further configured to allow the client device to access the network using the first protocol address when the first address status in the corresponding entry of the client device is NORMAL, and allow the client device to access the network using the second protocol address when the second address status in the corresponding entry of the client device is NORMAL.

* * * * *